United States Patent
Schult et al.

(10) Patent No.: US 9,434,004 B2
(45) Date of Patent: Sep. 6, 2016

(54) METHOD FOR PRODUCING ENGINE COMPONENTS WITH A GEOMETRICALLY COMPLEX STRUCTURE

(75) Inventors: Alexander Schult, Berlin (DE); Dan Roth-Fagaraseanu, Stahnsdorf (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 668 days.

(21) Appl. No.: 13/989,631

(22) PCT Filed: Nov. 25, 2011

(86) PCT No.: PCT/EP2011/071048
§ 371 (c)(1),
(2), (4) Date: Jun. 21, 2013

(87) PCT Pub. No.: WO2012/069641
PCT Pub. Date: May 31, 2012

(65) Prior Publication Data
US 2013/0259732 A1 Oct. 3, 2013

(30) Foreign Application Priority Data
Nov. 25, 2010 (DE) .................. 10 2010 061 958

(51) Int. Cl.
*B22F 7/06* (2006.01)
*B22F 3/10* (2006.01)
(Continued)

(52) U.S. Cl.
CPC ............ *B22F 7/06* (2013.01); *B22F 3/1021* (2013.01); *B22F 3/225* (2013.01); *B22F 7/062* (2013.01); *B23P 15/04* (2013.01); *B22F 2999/00* (2013.01)

(58) Field of Classification Search
None
See application file for complete search history.

(56) References Cited

U.S. PATENT DOCUMENTS

| 4,539,197 A | * | 9/1985 | Asaka et al. | ............ B22F 7/062 228/131 |
| 4,813,823 A | | 3/1989 | Bieneck | |

(Continued)

FOREIGN PATENT DOCUMENTS

| AT | 503442 | 10/2007 |
| CA | 2588626 A1 | 11/2008 |

(Continued)

OTHER PUBLICATIONS

German Search Report dated Jul. 15, 2011 from counterpart DE Application No. 10 2010 061 958.2.
(Continued)

*Primary Examiner* — George Wyszomierski
*Assistant Examiner* — Ngoclan T Mai
(74) *Attorney, Agent, or Firm* — Timothy J. Klima; Shuttleworth & Ingersoll, PLC

(57) ABSTRACT

A method for manufacturing thermally stressed engine components having a geometrically complex structure includes metal injection molding metal powder mixed with a binder to form green compacts of individual parts, which are debindered to form brown compact sections which are joined together to form a multi-part brown compact which are sintered in the assembled state. The brown compact sections have differing shrinkage properties in the sintering process, depending on the metal powder used, with a greater shrinking first brown compact section being automatically pressed against a second brown compact section during sintering. Connecting elements having positively engaging projections and recesses are provided at joining surfaces of the brown compact sections and have differing shrinkage such that during sintering of the assembled brown compact, the brown compact section with projections undergoes a greater shrinkage than the brown compact section with recesses.

20 Claims, 1 Drawing Sheet

Figure 1:
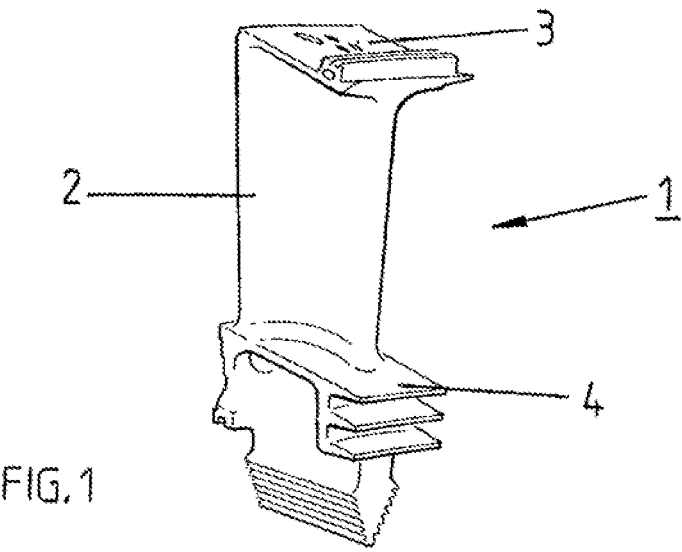

(51) Int. Cl.
*B22F 3/22* (2006.01)
*B23P 15/04* (2006.01)

(56) References Cited

U.S. PATENT DOCUMENTS

| | | |
|---|---|---|
| 5,487,773 A | 1/1996 | Seyama et al. |
| 5,654,106 A | 8/1997 | Purnell et al. |
| 6,033,788 A | 3/2000 | Cawley et al. |
| 6,488,887 B1 | 12/2002 | Arai et al. |
| 7,744,346 B2 | 6/2010 | Schreiber et al. |
| 2005/0036898 A1 | 2/2005 | Sweetland |
| 2006/0156843 A1 | 7/2006 | Becker |
| 2007/0102572 A1 | 5/2007 | Bohdal |
| 2007/0202000 A1 | 8/2007 | Andrees et al. |
| 2009/0196761 A1 | 8/2009 | James |
| 2009/0304497 A1 | 12/2009 | Meier et al. |
| 2010/0008778 A1 | 1/2010 | Patrick et al. |
| 2010/0236688 A1 | 9/2010 | Scalzo et al. |
| 2011/0020085 A1 | 1/2011 | Glaser et al. |

FOREIGN PATENT DOCUMENTS

| | | |
|---|---|---|
| DE | 10053199 | 5/2001 |
| DE | 10331397 | 1/2005 |
| DE | 102008042065 A1 | 3/2010 |
| DE | 102009049695 A1 | 1/2011 |
| EP | 1801352 | 6/2007 |
| EP | 2279827 A1 | 2/2011 |
| GB | 2448031 | 10/2008 |
| WO | WO2007005632 A1 | 1/2007 |
| WO | 2010/139571 | 12/2010 |
| WO | WO2012069641 A2 | 5/2012 |

OTHER PUBLICATIONS

English translation of International Search Report dated Apr. 6, 2012 from counterpart application.
International Search Report dated Apr. 6, 2012 from counterpart application.
European Search Report dated Apr. 17, 2013 from related European App No. 12198188.0.
Roth-Fagaraseanu—U.S. Appl. No. 13/720,577, filed Dec. 19, 2012.

* cited by examiner

METHOD FOR PRODUCING ENGINE COMPONENTS WITH A GEOMETRICALLY COMPLEX STRUCTURE

This application is the National Phase of International Application PCT.EP2011/071048 filed Nov. 25, 2011 which designated the U.S.

This application claims priority to German Patent Application No. DE102010061958.2 filed Nov 25, 2010, which application is incorporated by reference herein.

This invention relates to a method for manufacturing thermally stressed engine components having a geometrically complex structure by metal injection moulding of metal powder mixed with a binder, by which method individual parts of the engine component are produced as separately moulded green compact sections and then as debindered brown compact sections which are joined together to form a two-part or multi-part brown compact and sintered in the assembled state.

It is known to manufacture components of high geometrical complexity from different metals, for example special steels, case-hardened and tempered steels, intermetailic phases, light metals on titanium basis and the like, by metal injection moulding (MIM), with complete use of the material and with little or no reworking. In metal injection moulding, a metal powder is initially mixed with a binder made of thermoplastics and waxes to form a feedstock which is free-flowing and processable in an injection moulding process. The binder is then removed from the moulded part, or green compact, created by injection moulding by the use of solvents or heat, so that a porous moulded part—called the brown compact—is available and has the same dimensions as the green compact. In a subsequent heating process, the brown compact is sintered at slightly below the melting temperature of the respective metal in a sintering furnace, usually in an inert gas atmosphere or sometimes also in a vacuum. After sintering, in which the brown compact shrinks to the required final dimensions, the final moulded part is obtained, Reworking is generally not necessary.

It is known from DE 1 103 31 397 A1 to manufacture components of geometrically complicated shape for an aircraft gas turbine, in this case individual stator vane ring segments each consisting of two or more stator vanes plus an inner shroud section and an outer shroud section, by metal injection moulding. With this method, the inner and outer shroud sections are each prefabricated separately as a brown compact and then pre-sintered without shrinkage. The pre-sintered vane and shroud brown compacts are then joined together to form a stator vane segment and fixed relative to one another in the assembled position by clamps, and then sintered. A close contact at the mating surfaces, which is required for making a firm connection between the individual components, is not assured by the arrangement of clamps. Also, the restricted freedom of movement due to fixing by means of clamps can result in unwelcome deformations and cracks in the assembled stator vane segment during sintering.

US 2007/0202000 A1 describes a method for connecting two components manufactured by metal injection moulding, where the two components to be connected have differing shrinkage during sintering. The two components have projections or recesses, respectively, which positively engage in one another. During sintering, the component enclosing the projections of the other component exerts a pressure on these projections. The following connection of the two components is assured primarily by the projections and is therefore limited to a relatively small cross-sectional area (the base area of the projections) and hence to a relatively low joint strength.

The object underlying the invention is to provide a method for metal injection moulding of geometrically complex engine components joined together from separately prefabricated brown compacts, where a zero gap dimension is assured and a close and firm connection is achieved between the assembled brown compacts during the sintering process.

It is a particular object to provide solution to the above problems by a method in accordance with the features described herein.

Advantageous developments will become apparent from the present description.

When manufacturing thermally stressed engine components of geometrically complicated structure by metal injection moulding of metal powder mixed with a binder, by which method individual parts of the component are produced as separately moulded green compact sections and then as debindered brown compact sections which are joined together to form a multi-part brown compact and sintered in the assembled state, the brown compact sections have differing shrinkage properties depending on the type and size of the metal powder used. When sintering the brown compact joined together as mentioned above, more heavily shrinking brown compact sections are automatically pressed against less heavily shrinking brown compact sections, so that a zero gap dimension and a close connection are always assured between the brown compact sections, and even complicately shaped engine components can be produced in high quality in the metal injection moulding process. It is provided here that connecting elements in the form of positively engaging projections and recesses are provided at the joining surfaces of the brown compact sections to be joined and having differing shrinkage in such a way that during sintering of the assembled brown compact, the brown compact section with projections undergoes a greater shrinkage than the brown compact section with recesses.

The inventive solution provides that during sintering of the assembled brown compact, the brown compact section having recesses is drawn to the brown compact section having projections by its shrinking projections, whereby the respective contact surfaces are pressed against one another. This has the effect that a high pressure and hence an intensive surface contact of the two brown compact sections is achieved not only in the area of the projections and recesses, but particularly along all the contact surfaces along which the two brown compact sections are in contact with one another. The brown compact sections are pressed, during sintering of the assembled brown compact, in other words over a large area at surfaces provided adjacent to the projections and recesses on the brown compact sections. With the method in accordance with the invention therefore, a zero gap dimension between the contact surfaces is assured during the sintering process of the joined-together brown compacts, and a close and firm connection is achieved.

The differing shrinkage during sintering due to the metal powder used is furthermore advantageous to the extent that when the respective metal powder is selected, the differing thermal stresses on certain component areas can also be taken into account.

The cross-sectional area of the projections and recesses is designed such that the brown compact sections are drawn against one another during sintering of the assembled brown compact. The cross-sectional area can for example be designed in an approximately dovetail-shaped and tapering form. In another design variant, the projections have a convex curvature and the recesses a concave curvature, for example in the form of spherical projections and recesses. In this way, brown compact sections of non-rotationally symmetrical shape can also be firmly joined to one another without disruptive aids during the sintering process, and non-rotationally symmetrical engine components of complicated shape, for example turbine blades designed with shrouds, can be produced by metal injection moulding.

The projections and recesses are brought into positive engagement prior to sintering, for example by longitudinal displacement or rotation of the brown compact sections to be joined.

In accordance with a design variant of the invention, the surfaces at which the brown compact sections are drawn against one another during sintering of the assembled brown compact are arranged substantially parallel to one another, which entails their having a common curvature.

In the case of rotationally symmetrical engine components the assembled brown compact includes an inner brown compact section and an outer brown compact section enclosing the former with greater shrinkage which is shrunk onto the inner brown compact section during sintering of the assembled brown compact.

In accordance with a further embodiment of the invention, the assembled brown compact can be enclosed by an additional brown compact with greater shrinkage separately produced by metal injection moulding and acting as a tool. Thanks to the assembled brown compact thus supplemented, the brown compact sections required for the engine component are closely joined to one another during sintering. The additional brown compact acting as a tool is removed from the finished component after sintering.

In an embodiment of the invention, it is provided that the more heavily shrinking first brown compact section is an outer section and the second brown compact section is an inner section. The terms "outer" and "inner" refer here to the arrangement of the manufactured engine component inside an engine.

A further embodiment of the invention provides that the type and design of the metal powder used depend on the type and size of the metal powder particles, on the metal powder material and on the binder used. Differing metal powders in the meaning of the present invention are therefore already present when for example the binder used is different or is added in a differing degree to the metal powder particles used, even if the latter are of the same size and type. Differing metal powders in the meaning of the present invention are of course also present when for example the metal powder particles are of differing size and/or type.

A preferred exemplary embodiment of the invention is described in more detail in light of the accompanying drawing. In the drawing, FIG. 1 shows a turbine blade provided with an inner and an outer shroud and assembled of three separately manufactured brown compact sections, and FIG. 2 shows a schematic representation of the joining area of a brown compact assembled of two brown compact sections.

FIG. 1 shows, using the example of a turbine blade provided with an inner and an outer shroud, an engine component 1 of non-rotationally symmetrical design, joined together from three brown compact sections produced separately by metal injection moulding and then sintered and joined to one another in a sintering process. The three sintered brown compact sections form the airfoil 2, as well as an outer shroud 3 and an inner shroud 4 of the turbine blade.

For manufacture of the non-rotationally symmetrical engine component 1, in this case a turbine blade, separate green compacts of the outer and inner shrouds and of the airfoils are produced by metal injection moulding of a metal powder (feedstock) mixed with a thermoplastic binder. The binder is then removed from the green compacts by melting it out in a furnace (debindering), so that brown compact sections consisting of a porous material are now available for the airfoil as well as for the inner and outer shrouds.

Figure 2:
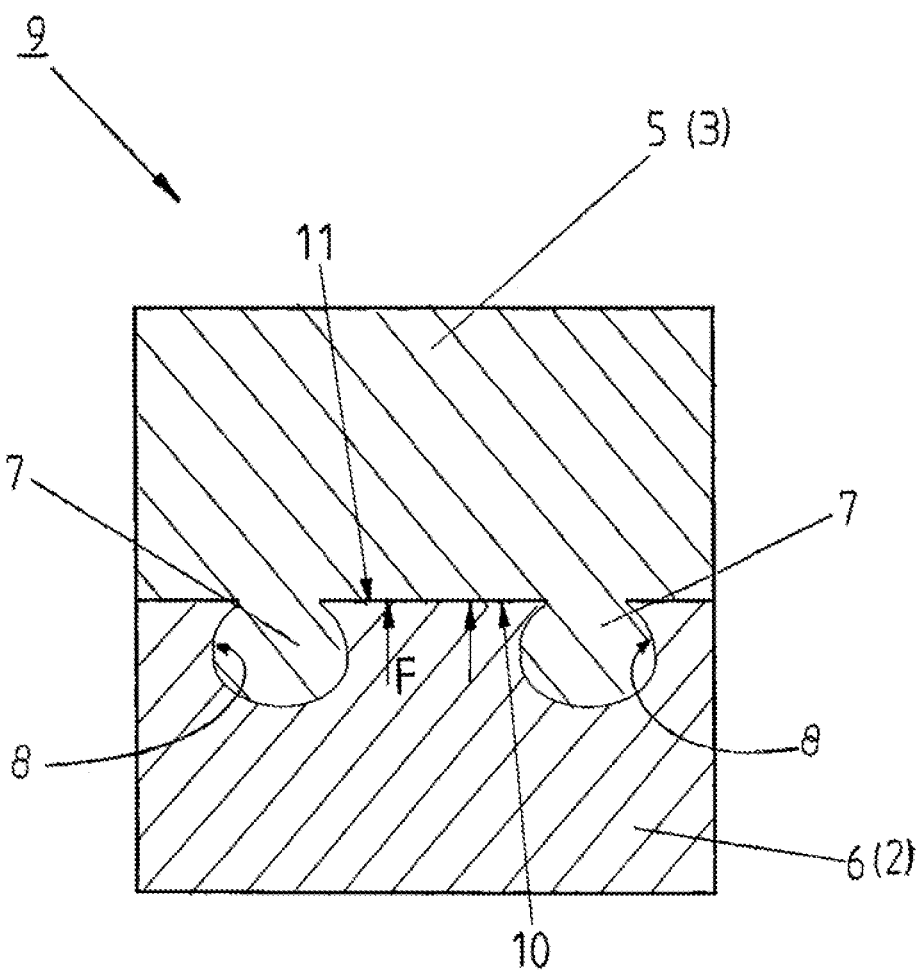

As shown by the joint illustrated in FIG. 2 between two separately produced outer and inner brown compact sections 5 and 6, approximately dovetail-shaped projections 7 tapering towards the contact surface 10 are located on the contact surface 10 of the outer brown compact section 5 corresponding to the inner surface of the outer shroud 3, and approximately dovetail-shaped tapering recesses 8 are located on the contact surface 11 of the inner brown compact section 6 corresponding to the upper edge of an airfoil 2. In the same manner, a further outer brown compact section (not shown)—intended for forming the inner shroud 4—is also provided with such projections which engage in recesses (not shown) provided on the lower edge of the inner brown compact section 6. Instead of dovetail-shaped tapering projections, projections tapering in another manner to the contact surface 10 can be alternatively provided.

The connecting elements created in the metal injection moulding process in the form of projections 7 and recesses 8 engage positively in one another in the assembled brown compact 9. The outer brown compact section 5 is designed by means of the type and size of the metal powder particles, the metal powder material and the binder used in such a way that it shrinks more heavily during sintering than the inner brown compact section 6. This means that during subsequent joint sintering of the outer and inner brown compact sections 5, 6 positively connected to one another by means of the recesses 8 and projections 7, a firm connection between the recesses and the projections engaging therein is created and the zero gap dimension between the joining surfaces 10, 11 is maintained.

Due to the dovetail-shaped design of the differently shrinking connecting elements, the two brown compact sections 5, 6 are also drawn and pressed against one another, so that a close joint between the outer and inner brown compact sections 5, 6 can be achieved, and as a result of the sintering process an engine component of geometrically complicated structure and made of differing materials depending on the thermal load can be provided by metal injection moulding. As a result of the fact that the outer brown compact section 5 shrinks more heavily, the projections 7 of the brown compact section 5 draw the brown compact section 6 to the brown compact section 5, with the respective contact surfaces 10, 11 being pressed against one another. The corresponding force acting on the brown compact section 6 and leading to a contact pressure between the two brown compact sections 5, 6 along the contact surfaces 10 11 is indicated in FIG. 2 by arrows F.

The contact surfaces 10, 11 provided adjacent to the projections and/ or recesses 7, 8 are designed substantially parallel in one embodiment, which includes their forming curved surfaces in the same manner. This ensures large-surface and intensive pressing during sintering.

The previously described exemplary embodiment focused on the manufacture of non-rotationally symmetrical components formed from two (or more) brown compacts designed with connecting elements each having different shrinkage behaviour. The invention is however not restricted to the exemplary embodiment explained in the above. Proceeding from the basic idea of the invention, i.e. to press together the brown compacts to be joined by their different shrinkage, it may be sufficient in the case of rotationally symmetrical components, even without the connecting elements 7, 8 mentioned, when an outer brown compact section enclosing the inner brown compact section has greater shrinkage, so that the separately produced rotationally symmetrical brown compact sections are firmly pressed against one another during sintering. Finally, it is also conceivable to use an additional and more heavily shrinking brown compact as a tool to enclose the brown compact sections to be connected and to press them firmly against one another during joint sintering.

LIST OF REFERENCE NUMERALS

1 Engine component
2 Airfoil
3 Outer shroud
4 Inner shroud
5 Outer brown compact section (outer shroud)
6 Inner brown compact section (airfoil)
7 Projection (connecting element)
8 Recess (connecting element)
9 Brown compact assembled from 5 and 6
10 Contact surface of outer brown compact section 5
11 Contact surface of inner brown compact section 6

What is claimed is:

1. A method for manufacturing a thermally stressed engine component having a geometrically complex structure, comprising:
    metal injection molding a first green compact section with a first mixture of metal powder and binder;
    metal injection molding a second green compact section with a second mixture of metal powder and binder;
    debindering the first green compact section and the second green compact section to form a first brown compact section and a second brown compact section, respectively;
    providing that the first brown compact section includes a first joining surface with a connecting projection and the second brown compact section includes a second joining surface with a connecting recess;
    assembling the first brown compact section and the second brown compact section together such that the first joining surface is adjacent the second joining surface and the connecting projection is engaging the connecting recess to form a multi-part brown compact;
    providing that the first brown compact section has greater shrinkage during sintering than the second brown compact section by providing that the first mixture of metal powder and binder is different from the second mixture of metal powder and binder;
    sintering the multi-part brown compact such that the first brown compact section and the second brown compact section are automatically drawn together to press against each other due to the different shrinkages.

2. The method in accordance with claim 1, and further comprising providing the connecting projection with a convex curvature and the connecting recess with a concave curvature.

3. The method in accordance with claim 2, and further comprising providing that the first joining surface is substantially parallel to the second joining surface in the multi-part brown compact.

4. The method in accordance with claim 2, and further comprising providing that the first brown compact section and the second brown compact sections are rotationally symmetrical, with the first brown compact section being an outer brown compact section and the second brown compact section being an inner brown compact section in the multi-part brown compact, such that the outer brown compact section and the inner brown compact section press radially against one another after sintering.

5. The method in accordance with claim 2, and further comprising:
    providing a third brown compact section with a greater shrinkage than the first brown compact section; and
    enclosing the multi-part brown compact with the third brown compact section to press against the multi-part brown compact during sintering; and
    removing the third brown compact section from the multi-part brown compact after sintering.

6. The method in accordance with claim 2, and further comprising providing that the first brown compact section is an outer brown compact section and the second brown compact section is an inner brown compact section in the multi-part brown compact.

7. The method in accordance with claim 6, and further comprising providing that the first mixture of metal powder and binder is different from the second mixture of metal powder and binder by providing in the second mixture of powder and binder, as compared to the first mixture of powder and binder, at least one chosen from: a different metal powder material, a different size of metal powder particles, a different binder material, and a different ratio of metal powder to binder.

8. The method in accordance with claim 1, and further comprising providing the connecting projection and the connecting recess with corresponding dovetail shapes.

9. The method in accordance with claim 8, and further comprising providing that the first joining surface is substantially parallel to the second joining surface in the multi-part brown compact.

10. The method in accordance with claim 8, and further comprising providing that the first brown compact section and the second brown compact sections are rotationally symmetrical, with the first brown compact section being an outer brown compact section and the second brown compact section being an inner brown compact section in the multi-part brown compact, such that the outer brown compact section and the inner brown compact section press radially against one another after sintering.

11. The method in accordance with claim 8, and further comprising:
    providing a third brown compact section with a greater shrinkage than the first brown compact section; and
    enclosing the multi-part brown compact with the third brown compact section to press against the multi-part brown compact during sintering; and
    removing the third brown compact section from the multi-part brown compact after sintering.

12. The method in accordance with claim 8, and further comprising providing that the first brown compact section is an outer brown compact section and the second brown compact section is an inner brown compact section in the multi-part brown compact.

13. The method in accordance with claim 12, and further comprising providing that the first mixture of metal powder and binder is different from the second mixture of metal powder and binder by providing in the second mixture of powder and binder, as compared to the first mixture of powder and binder, at least one chosen from: a different metal powder material, a different size of metal powder particles, a different binder material, and a different ratio of metal powder to binder.

14. The method in accordance with claim 1, and further comprising providing that the first joining surface is substantially parallel to the second joining surface in the multi-part brown compact.

15. The method in accordance with claim 1, and further comprising providing that the first brown compact section and the second brown compact sections are rotationally symmetrical, with the first brown compact section being an outer brown compact section and the second brown compact section being an inner brown compact section in the multi-part brown compact, such that the outer brown compact section and the inner brown compact section press radially against one another after sintering.

16. The method in accordance with claim 1, and further comprising:
    providing a third brown compact section with a greater shrinkage than the first brown compact section; and
    enclosing the multi-part brown compact with the third brown compact section to press against the multi-part brown compact during sintering; and
    removing the third brown compact section from the multi-part brown compact after sintering.

17. The method in accordance with claim 1, and further comprising providing that the first brown compact section is an outer brown compact section and the second brown compact section is an inner brown compact section in the multi-part brown compact.

18. The method in accordance with claim 17, and further comprising providing that the first mixture of metal powder and binder is different from the second mixture of metal powder and binder by providing in the second mixture of powder and binder, as compared to the first mixture of powder and binder, at least one chosen from: a different metal powder material, a different size of metal powder particles, a different binder material, and a different ratio of metal powder to binder.

19. The method in accordance with claim 1, and further comprising providing that the first mixture of metal powder and binder is different from the second mixture of metal powder and binder by providing in the second mixture of powder and binder, as compared to the first mixture of powder and binder, at least one chosen from: a different metal powder material, a different size of metal powder particles, a different binder material, and a different ratio of metal powder to binder.

20. The method in accordance with claim 1, and further comprising:
    providing that the first joining surface includes a first intermediate section positioned between two connecting projections and the second joining surface includes a second intermediate section positioned between two connecting recesses;
    assembling the first brown compact section and the second brown compact section together such that the first intermediate section is adjacent the second intermediate section and the two connecting projections are engaging the two connecting recesses respectively to form the multi-part brown compact;
    sintering the multi-part brown compact such that the first brown compact section and the second brown compact section are automatically drawn together to press the first intermediate section against the second intermediate section.

* * * * *